United States Patent

Kaiser et al.

[11] Patent Number: 5,597,243
[45] Date of Patent: Jan. 28, 1997

[54] RADIAL ROLLING BEARING

[75] Inventors: Theodor Kaiser, Hochstadt an der Aisch; Roland Lippert, Furth; Cornelius Hartmann, Nuremberg; Horst D. Kohler, Herzogenaurach; Ernst Mayer, Grossenseebach; Bruno Scherb, Cadolzburg, all of Germany

[73] Assignee: Ina Walzlager Schaeffler KG, Germany

[21] Appl. No.: 411,611

[22] PCT Filed: Oct. 13, 1993

[86] PCT No.: PCT/EP93/02817

§ 371 Date: Apr. 6, 1995

§ 102(e) Date: Apr. 6, 1995

[87] PCT Pub. No.: WO94/10470

PCT Pub. Date: May 11, 1994

[30] Foreign Application Priority Data

Oct. 31, 1992 [DE] Germany ............... 42 36 847.3

[51] Int. Cl.⁶ ..................................... F16C 33/51
[52] U.S. Cl. .............................................. 384/551
[58] Field of Search ........................... 384/525, 551, 384/552, 553, 555

[56] References Cited

U.S. PATENT DOCUMENTS

| | | |
|---|---|---|
| 3,058,789 | 10/1962 | Ham . |
| 3,517,975 | 6/1970 | Lonngren et al. . |
| 4,277,117 | 7/1981 | George . |
| 4,896,974 | 1/1990 | Shimizu . |

FOREIGN PATENT DOCUMENTS

| | | |
|---|---|---|
| 1104502 | 11/1955 | France . |
| 1215359 | 4/1960 | France . |
| 1332286 | 6/1963 | France . |
| 86757 | 2/1966 | France . |
| 2066603 | 6/1971 | France . |
| 2071234 | 9/1971 | France . |
| 499378 | 6/1930 | Germany . |
| 2928269 | 1/1971 | Germany . |
| 740703 | 11/1955 | United Kingdom . |
| 1172015 | 11/1969 | United Kingdom . |

OTHER PUBLICATIONS

German Search Report No. International PCT/EP93/02817.

*Primary Examiner*—Lenard A. Footland
*Attorney, Agent, or Firm*—Bierman & Muserlian

[57] ABSTRACT

The invention concerns a radial rolling bearing having cylindrical rolling elements which roll between an inner and an outer ring while individual spacers are disposed between every two adjacent rolling elements, the spacers comprising, on both sides of their central longitudinal plane, contact surfaces while being guided during rotation of the radial rolling bearing by one of their end sections on a raceway of the inner or the outer ring.

13 Claims, 8 Drawing Sheets

RADIAL ROLLING BEARING

The invention concerns a radial rolling bearing having cylindrical rolling elements which roll between an inner and an outer ring while individual spacers are disposed between every two adjacent rolling elements, the spacers comprising, on both sides of their central longitudinal plane, contact surfaces while being guided during rotation of the radial rolling bearing by one of their end sections on a raceway of the inner or the outer ring.

A rolling bearing comprising such spacers is described in EP-A-0 164 968. An inner and a coaxial outer ring of the bearing form inner and outer raceways with an annular gap therebetween. A plurality of rolling elements bear against the raceways and are disposed annularly in alternation with wedge-shaped spacers in the gap. The radius of the contact surfaces of the spacers is larger than the radius of the rolling elements and this leads to the formation of wedge-shaped gaps between the rolling elements and the spacers which is intended to facilitate the formation of a lubricant film at the line of contact between a rolling element and a spacer.

The disadvantage of such spacers is that they surround the rolling elements on a relatively large part of the periphery thereof so that no adequate quantity of lubricant is available to cool the rolling elements and the raceways.

Further, the shape of the spacers leads to increased friction and consequently to a more intensive braking effect because the shearing force of the rolling elements is applied in the region of the inclined contact surface of the spacer and resolved, in keeping with the parallelogram of forces, into a radial force $F_R$ and a peripheral force $F_U$ acting perpendicular thereto. However, the braking force $F_B$ opposed to the peripheral force $F_U$ is a function of the magnitude of the radial force $F_R$ and the coefficient of sliding friction.

Particularly in the case of high peripheral speeds, such spacers have a tendency to bind and are therefore, also because of the lubrication problems encountered, only suitable for rolling bearings with low peripheral speeds.

It is an object of the invention to provide a spacer for a rolling bearing with which less friction occurs and which can be used even with high peripheral speeds.

The invention achieves this object by the fact that one portion of the contact surfaces on each side of a pitch circle of the radial rolling bearing has a convex, a concave or a flat contour and that a radius of curvature of the contact surfaces of the end sections is larger than the radius of curvature of the rolling elements and, in the case of a concave configuration of said portion, the radius of curvature thereof is larger than the radius of curvature of the contact surfaces of the end sections.

This configuration of the spacers assures that the rolling elements and the contact surfaces of the spacers are only in tangential contact with one another so that an osculation between the rolling elements and the spacers is excluded. Due to the absence of osculation between the rolling elements and the spacers, the lubricant has a substantially improved access to the space between the rolling elements and the spacers whereby the cooling of the rolling bearing is also substantially improved. No osculation occurs between the spacers and the rolling elements even when, due to the centrifugal force at a high peripheral speed of the rolling bearing, the spacers are guided on the outer raceway. In this case too, the convex, concave or flat regions of the spacers bear against the rolling elements.

Due to this region of the contact surfaces, a different point of application of the shearing force $F_{Sch}$ is obtained as compared to known types of spacers. Since the direction of application of the shearing force $F_{Sch}$ is always perpendicular to the contact surfaces of the spacers, the shearing force $F_{Sch}$ is identical with the peripheral force $F_U$, that is to say, the spacers do not have a braking effect in this case because the braking force $F_B$ requires a radial component $F_R$ of the shearing force $F_{Sch}$. These force conditions also apply when the spacer is pressed outwards against the outer raceway by the centrifugal force at high rotational speeds.

Further embodiments and modifications of the invention form the subject matter of the sub-claims and are described more closely in the following.

If at least one end section of the spacer comprises a sliding shoe whose surface facing the raceway is curved, this sliding shoe is configured as a ring segment which is preferably configured with a smaller radius of curvature than the raceway of the outer ring so that a wedge-shaped passage for lubricant can be formed in the peripheral direction. However, the sliding shoe may also have a mushroom-type contour, i.e. its parts extending towards the rims of the rolling bearing can have a curved configuration.

The region of the spacer situated between the end sections of the contact surfaces can have a convex contour both in the longitudinal and in the transverse direction. With such a spherical configuration of the central region of the contact surface, a pointwise contact between the rolling elements and the spacers is obtained resulting in particularly favorable friction conditions as well as particularly improved access for the lubricant. in a further embodiment of the invention the central regions of the end sections of the contact surfaces adjacent to the inner and/or outer ring comprise recesses. This assures that the support of the spacer in the bearing rings is obtained by an interrupted linear contact between the spacer and the raceways so that the lubrication of the raceways is impaired only as little as possible.

The width of the spacers is smaller than the width of the raceways or of the rolling elements. In this case too, a reduced linear contact between the spacer and the raceways hardly detracts from the lubrication of the bearing rings.

In another embodiment of the invention the edge regions of the end sections of the contact surfaces adjoining the inner and/or outer ring comprise recesses. In this way, the contact surfaces extend between the rims towards the outer raceway while engaging under the rims of the outer ring to use them as a guide surface. This also results in an axial retention and provides the necessary support in the radial direction. This embodiment has the advantage that a perfectly free lubricant flow is possible with respect to the raceway of the outer ring.

Rolling elements are snapped into the central region of the spacers. By the arrangement of balls or cylindrical rollers for instance, the sliding friction between the spacers and the rolling elements of the rolling bearing is converted into a rolling friction whereby the friction work of the rolling bearing is reduced on the whole.

In another embodiment of the invention the central region of the spacers comprises a recess at its center. Such recesses in the spacers in the region of the rolling element pitch circle permit the creation of a large grease chamber, an improved flow of the lubricant and consequently a reduction of the lost work in the rolling bearing caused by friction. The spacers are made of a plastic or a ceramic material or of an aluminium or copper alloy.

A preferred material for the spacers is a technical plastic material and the spacers are made as injection molded or pressed plastic parts so that their manufacturing is efficient and inexpensive. The surface quality of an injection molded plastic spacer meets the requirements by all means, even without a finishing treatment. Moreover, many plastic materials, for example polyamides, possess good self-lubricating properties so that no damage occurs even when the rolling bearing runs dry for a short time. To improve their strength properties, the plastic materials can be reinforced with glass or carbon fibers or with fibers of other materials. It is also possible to use plastic materials with incorporated lubricant.

If the spacers are made of a ceramic material, they possess the advantages of high temperature resistance, good sliding properties and low density.

However, the invention also envisages the production of the spacers out of aluminium and copper alloys such as brass and bronze. Such spacers can be made economically by continuous casting and then cut into required lengths. Spacers made of metals have a high strength.

In another embodiment of the invention the spacers are made of sheet metal and their ends facing the rolling elements and the raceways of the outer and the inner ring are covered with a plastic sliding layer such as permaglide.

Besides higher strength as compared to spacers made of a plastic material, this embodiment has the advantage that the convex part of the contact surface can be made resilient in the peripheral direction so that any rattling noises due to an abutment of the rolling elements and the spacers against one another can be avoided.

If the spacers are formed so that they have contact surfaces with a radius of curvature in the region of their end sections which is larger than the radius of curvature of the rolling elements, the end sections of the contact surfaces adjoining the inner and/or outer ring have an elastic configurarion. Due to the elastic configuration of the contact surfaces, a spacer Of the invention can be compressed in the peripheral direction and thus be pushed in between the individual rolling elements during assembly.

The contact surfaces are arranged angularly offset to each other on the two sides of the central longitudinal plane. Due to this offset arrangement of the contact surfaces, the spacer of the invention can be used in rolling bearings in which the axes of rotation of the rolling elements extend in alternating crosswise directions to one another, i.e. in cross roller bearings.

Finally, the end sections of the contract surfaces bearing against the raceways comprise a bevel. Due to this bevelling of the edges, a wiping-off of the lubricant from the raceways of the bearing rings is avoided.

The invention will now be explained more closely with the help of the following examples of embodiment.

DETAILED DESCRIPTION OF THE INVENTION

Figure 1:
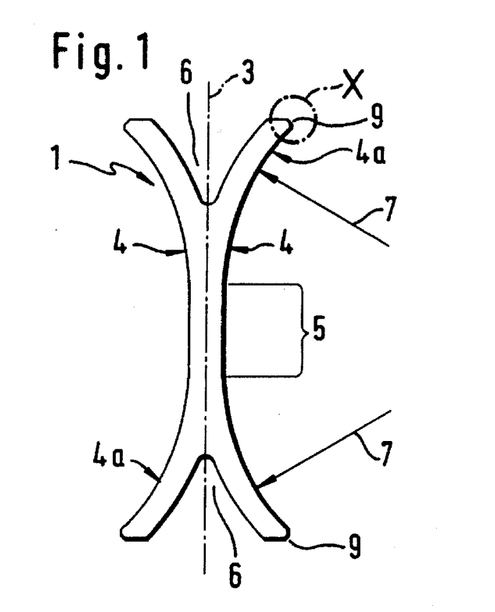
FIG. 1 is a front view of a spacer of the invention.
Figure 2:
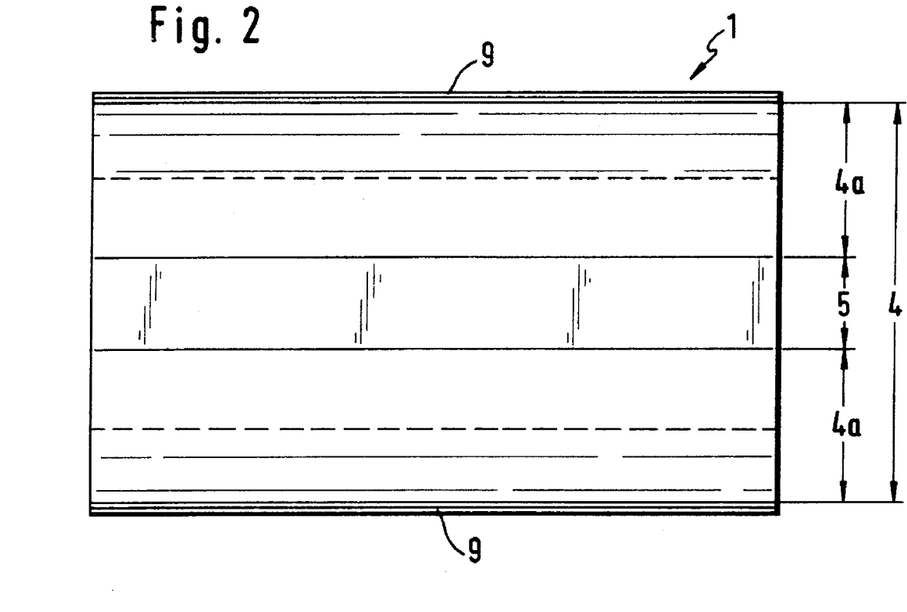
FIG. 2 is a side view of a spacer.

The spacer 1 represented in FIGS. 1 and 2 is preferably used in large bearings and arranged between the individual rolling elements. The spacers 1 are intended to prevent the rolling elements from coming into direct contact with one another and thus suffering wear.

As can be seen in FIGS. 1 and 2, such a spacer 1 comprises on opposite sides of a central longitudinal plane 3, contact surfaces 4 for rolling elements, not shown in these figures. Starting from their center points, the two contact surfaces 4 of the present example at first have a flat configuration which merges in both radial directions into a concave shape, the radii of curvature 7 of the end sections 4a being larger than the radii of curvature of the rolling elements. The flat part of the contact surface 4 is referenced at 5. The contact surfaces 4 of the spacer 1 situated symmetrically opposite each other extend continuously away from each other in the direction of the inner and the outer ring of the rolling bearing so that a triangular recess 6 extending over the entire length of the spacer 1 in the axial direction is formed between the contact surfaces 4.

FIG. 2 shows that, seen from the side, the spacer 1 has a rectangular shape and the upper and lower edges of its side wall comprise a bevel 9.

Figure 3:
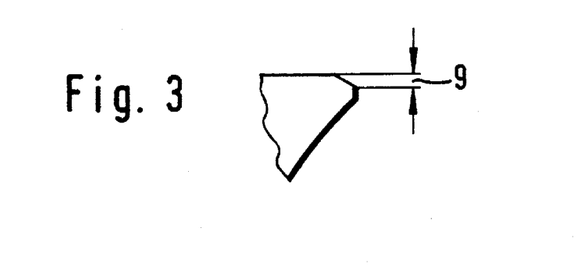
FIG. 3 is an enlarged detail X of FIG. 1.

This bevel 9 is represented in the enlarged detail X of FIG. 2 shown in FIG. 3. These bevelled edges have the advantage of permitting an unhindered formation of a lubricant film on the raceways of the inner and outer rings.

Figure 4:
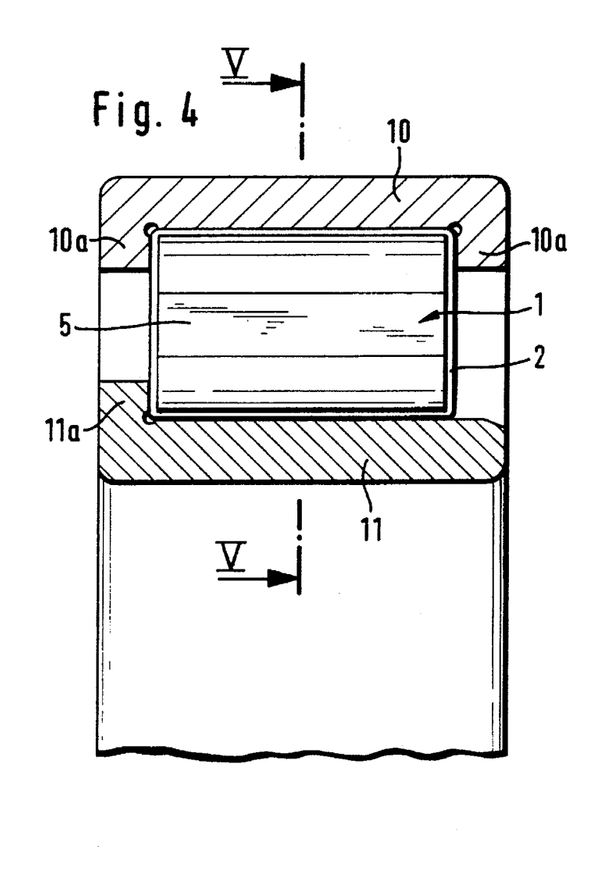
FIG. 4 is a longitudinal cross-section through a cylindrical roller bearing having a spacer of the invention.
Figure 5:
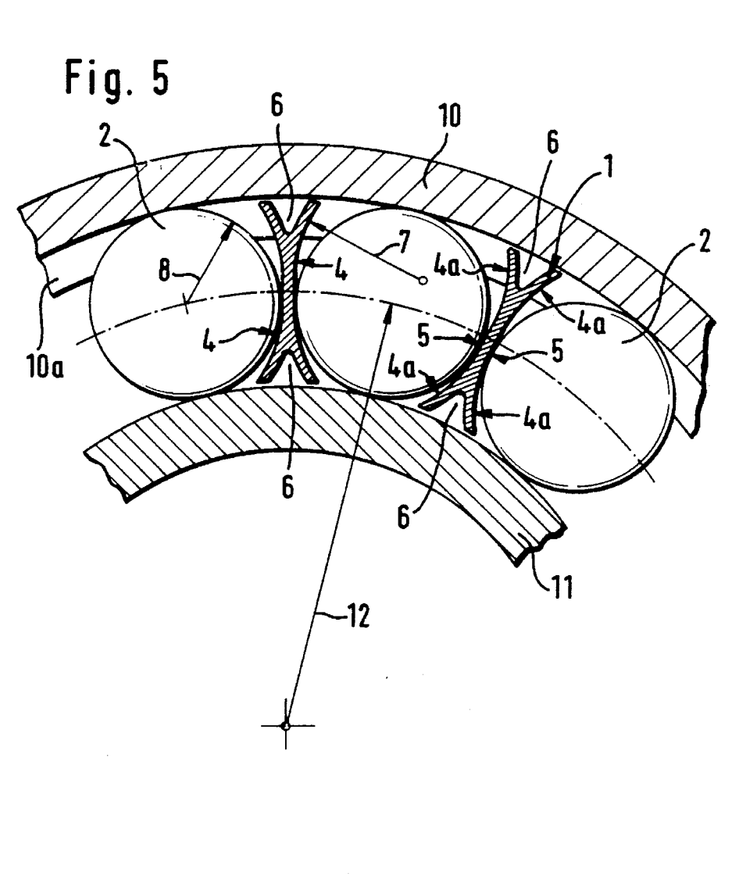
FIG. 5 is a cross-section through a cylindrical roller bearing with a spacer, taken along line V—V of FIG. 4.

The manner of cooperation between the spacer 1 and the rolling elements 2 in the rolling bearing can be seen in FIGS. 4 and 5.

As is clear from FIG. 4, the spacer 1 is guided in the radial direction by the raceways of the outer and the inner ring, 10 and 11, and in the axial direction, by the rims 10a and 11a of these rings. In the present example, the outer dimensions of the spacer 1 are chosen so that it fills the entire space defined by the raceways of the outer and the inner ring 10, 11, and by their rims 10a and 11a.

The arrangement of the spacers 1 and the rolling elements 2 with respect to one another is shown in FIG. 5. They are arranged in alternating sequence with one another which means that a rolling bearing always comprises the same number of spacers 1 as rolling elements 2.

As can be further seen in FIG. 5, the spacer 1 is guided on the one hand by the raceways of the outer and the inner ring, 10 and 11, and on the other hand, by the adjoining rolling elements 2 so that it can be displaced only in the peripheral direction and is thus always retained in a stable position. At high rotational speeds of the bearing, the spacer 1 is lifted from the raceway of the inner ring 11 and then has contact only with the raceway of the outer ring 10 and the adjoining rolling elements 2.

The radii of curvature 7 of the end sections 4a are larger than the radii of curvature 8 of the rolling elements 2. This leads to the formation of a wedge-shaped gap between the rolling elements 2 and the spacer 1 for receiving lubricant.

Due to the novel feature of the convex, concave or flat contour of the portion 5 of the contact surface 4 inside and outside the pitch circle 12 of the rolling elements 2, the hitherto occurring osculation between the spacer 1 and the rolling elements 2 is reduced so that, on the one hand, access for the lubricant is improved and on the other hand, due to an exactly defined point of application of force by the rolling elements 2 on the spacer 1 within the portion 5 of the contact surface 4 in the peripheral direction, the braking effect of the spacers 1 and thus also their binding is prevented.

The end sections 4a of the contact surfaces 4 situated near the raceways of the outer and the inner ring, 10 and 11, and separated from each other by the triangular recess 6, can be given an elastic configuration so that the last spacer 1 to be inserted can be pressed under elastic deformation into the gap between the last two rolling elements 2. In bearings having stop discs in place of rims, an axial assembly is possible even if the contact surfaces 4 have rigid end sections 4a.

Figure 6:
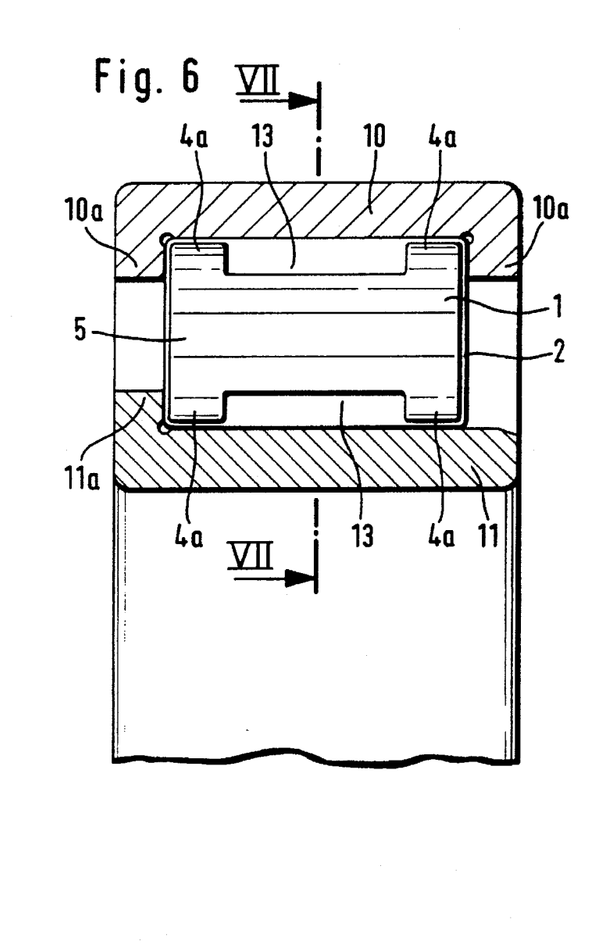
FIG. 6 is a longitudinal cross-section through a cylindrical roller bearing having a spacer of the invention in which recesses are arranged in the central portions of the end regions of the contact surfaces adjoining the bearing rings.
Figure 7:
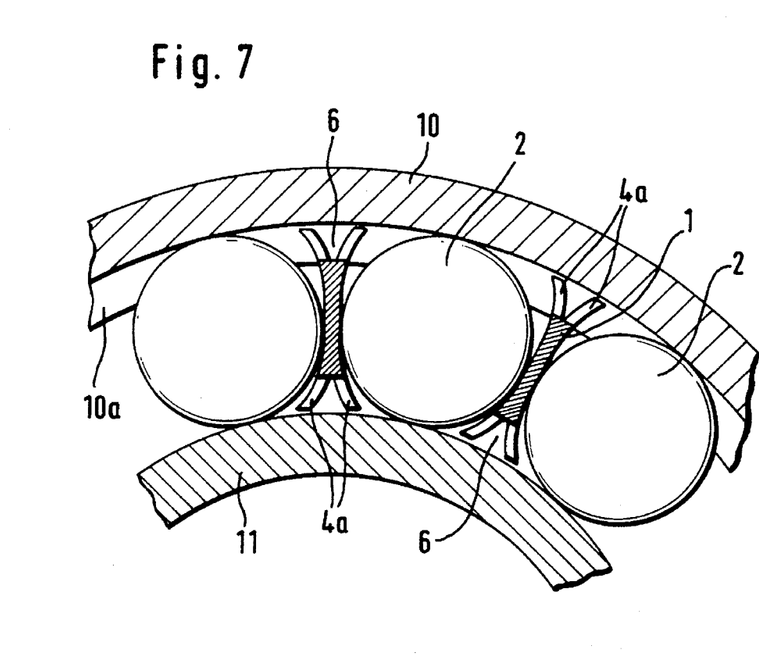
FIG. 7 is a cross-section through a cylindrical roller bearing taken along line VII—VII of FIG. 6.

The rolling bearing represented in FIGS. 6 and 7 differs from that of FIGS. 4 and 5 only by the different configuration of the spacer 1. For this reason, the same reference numbers have been used here as also in all the remaining figures.

The distinguishing feature of the spacer 1 is that the end sections 4a of the contact surfaces 4 comprise recesses 13 at their centers near the raceways of the outer and the inner ring, 10 and 11.

Thus, there is an interrupted linear contact in the axial direction between the spacer 1 and the raceways of the outer and the inner ring, 10 and 11, so that the formation of a lubricant film on the raceways of the outer and the inner ring, 10 and 11, is not obstructed, i.e. the recess 13 permits a perfectly free passage of the lubricant.

Figure 8:
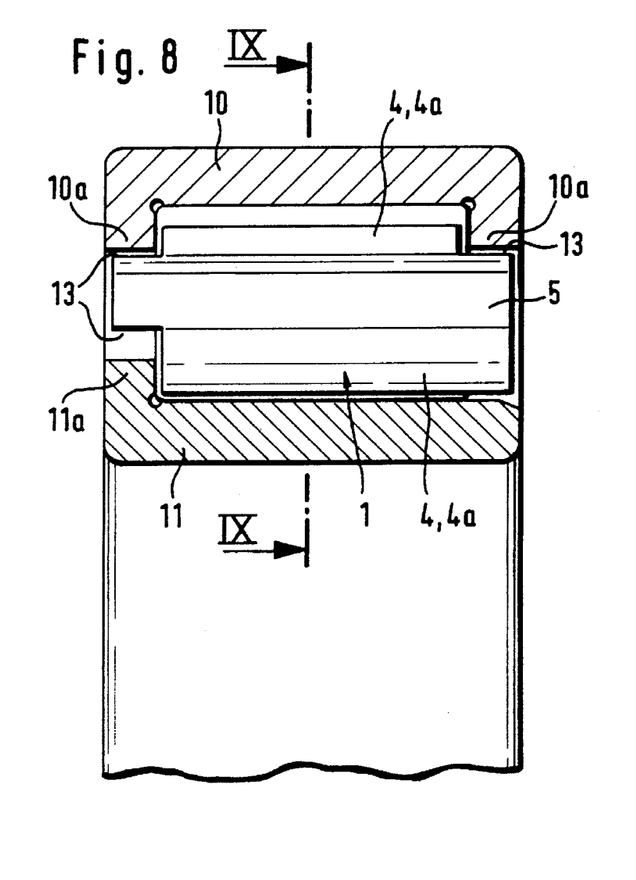
FIG. 8 is a longitudinal cross-section through a cylindrical roller bearing having a spacer of the invention in which recesses are arranged in the edge regions of the end regions of the contact surfaces adjoining the bearing rings.
Figure 9:
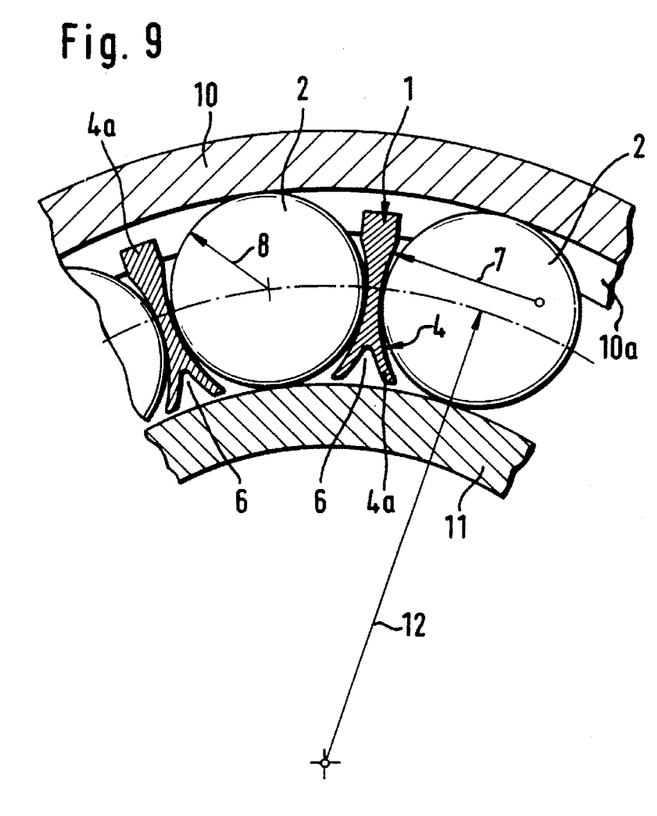
FIG. 9 is a cross-section through a cylindrical roller bearing taken along line IX—IX of FIG. 8.

The spacer 1 shown in FIGS. 8 and 9 extends axially approximately up to the end faces of the rims 10a and 11a and comprises, in edge regions of its outer ends, recesses 13. On its side facing the outer ring 10, the spacer comprises one such recess 13 both on the left and on the right, while on its opposite side, due to the rim 11a, there is a recess 13 only on the left-hand side.

The radial and axial guidance of the spacer 1 is effected by the raceway of the inner ring 11 and by the rims 10a and 11a. Under the influence of the centrifugal force at increased rotational speeds of the bearing, the radial and axial guidance of the spacer 1 is effected exclusively by the rims 10a and 11a.

As can be further seen in FIG. 9, the entire contact surface 4 of the spacer 1 has a concave configuration. Starting from its end sections 4a, the contact surface 4 at first has a radius of curvature 7 which is larger than the radius of curvature 8 of the rolling elements 2 and then continues into a central portion 5 whose radius of curvature, not referenced, is substantially larger than the radius of curvature of the rolling elements 2.

Figure 10:
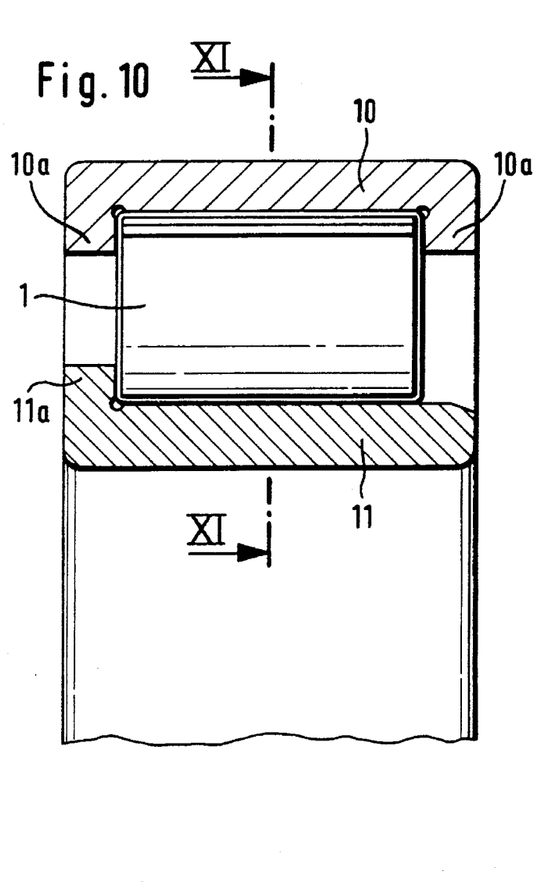
FIG. 10 is a longitudinal cross-section through a cylindrical bearing having a spacer of the invention comprising a sliding shoe on its end facing the outer ring.
Figure 11:
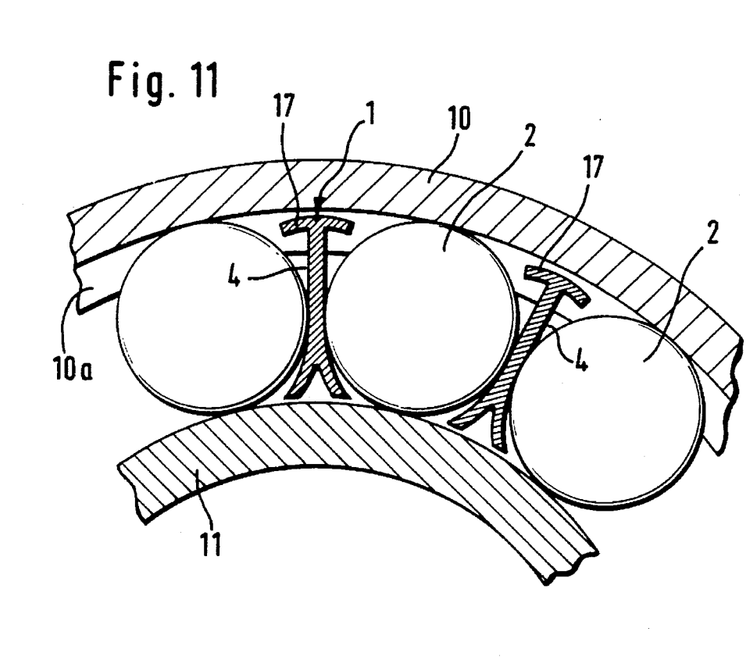
FIG. 11 is a cross-section through a cylindrical roller bearing taken along line XI—XI of FIG. 10.

In the embodiment of FIGS. 10 and 11, the spacer 1 comprises a sliding shoe 17 at its end facing the outer ring 10. This sliding shoe 17 is made as a ring segment and has a radius of curvature, not referenced, which is substantially smaller than the radius of the raceway of the outer ring 10. This leads to the formation of a lubrication-promoting wedge-shaped gap between the raceway of the outer ring 10 and the bearing face of the sliding shoe 17. Besides this, due to the configuration of the sliding shoe 17, a linear contact is obtained between the sliding shoe and the raceway of the outer ring.

Figure 12:
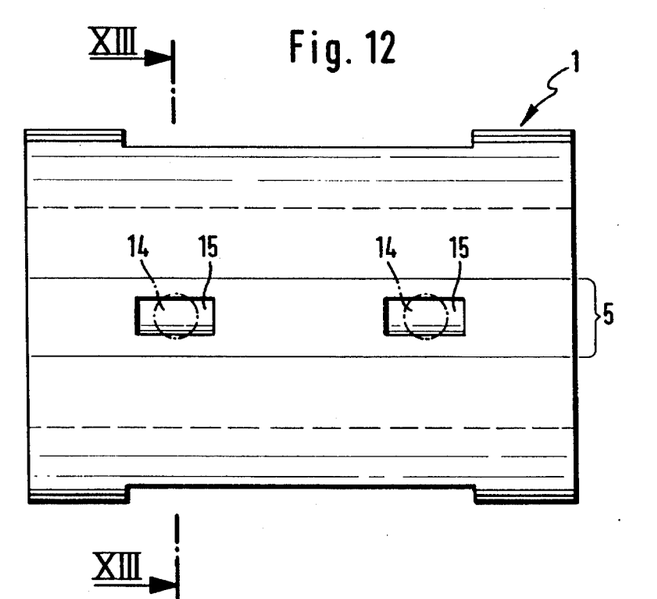
FIG. 12 is a side view of a spacer having balls or cylindrical rollers snapped into its flat, convex or concave region.

The spacer 1 of FIG. 12 comprises, in the portion 5 of its contact surfaces 4, recesses, not referenced, for lodging balls 14 or cylindrical rollers 15. These recesses are arranged along a center line of the spacer 1 at a distance from the edges and from one another. Advantageously, each spacer 1 comprises two balls 14 or two cylindrical rollers 15 to assure uniform contact with the rolling elements 2 of the rolling bearing.

Figure 13:
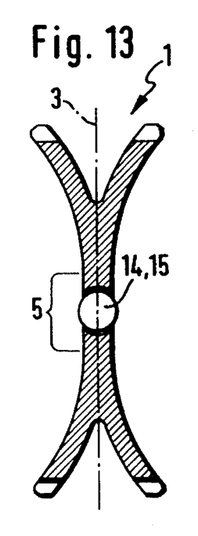
FIG. 13 is a cross-section of a spacer taken along line XIII—XIII of FIG. 12.

As can be seen in FIG. 13, the diameter of the balls 14 or the cylindrical rollers 15 is slightly larger than the thickness of the region 5 of the spacer 1 so that the snapped-in balls 14 or cylindrical rollers 15 can be contacted on both sides by adjoining rolling elements 2, not shown. During a rotation of the rolling bearing, the rolling elements 2 and the balls 14 or the cylindrical rollers 15 rotate in the same direction at their points of contact so that the hitherto encountered sliding friction between spacer 1 and rolling elements 2 is replaced by a rolling friction between balls 14 or cylindrical rollers 15 and rolling elements 2.

Figure 14:
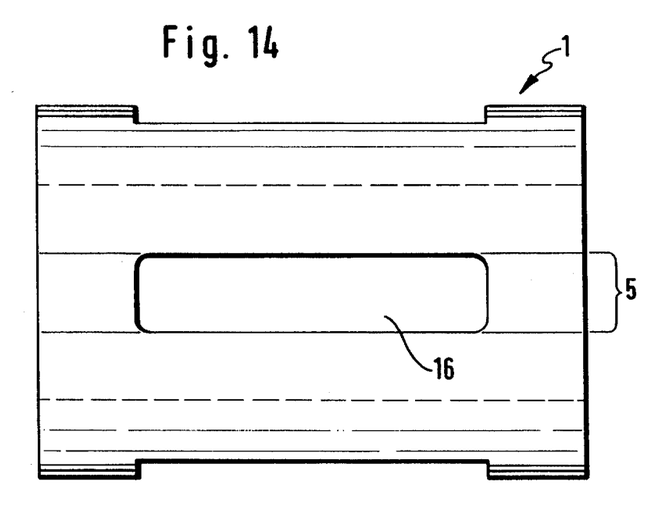
FIG. 14 is a side view of a spacer whose flat, convex or concave region comprises a recess.

According to FIG. 14, the convex, concave or flat region 5 of the spacer 1 comprises a through-recess 16 at its center. Due to this recess 16, the contact between the spacer 1 and the rolling elements 2 is limited to the contact surface 5 still subsisting at the two edges. The lost work of the rolling bearing is reduced, on the one hand, by the creation of a larger lubricant chamber which results in better lubrication and on the other hand, by the reduction of the contact surfaces between the spacer 1 and the rolling elements 2.

FIGS. 15 to 18 show a spherical configuration of the central portion 5 of the contact surfaces 4.

Figure 15:
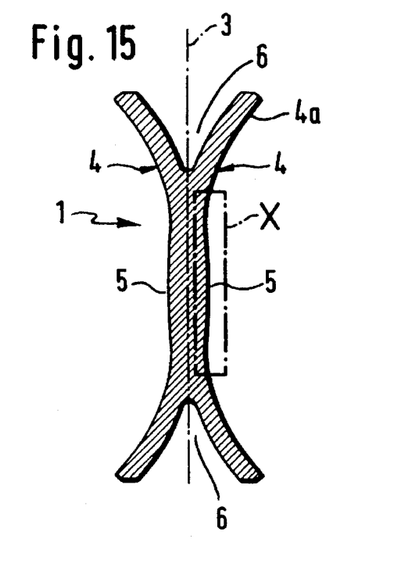
FIG. 15 is a cross-section through a spacer of the invention whose central region has a convex contour both in the transverse and in the longitudinal direction.
Figure 16:
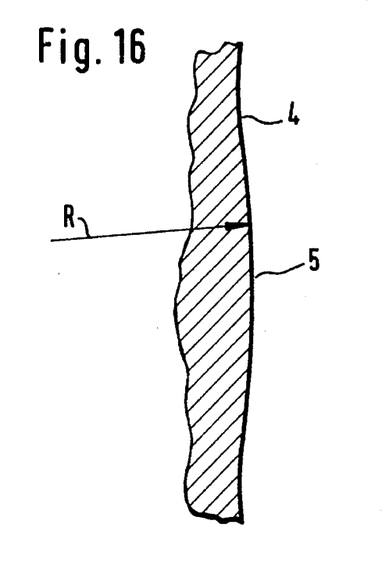
FIG. 16 is an enlarged detail X of FIG. 15.

As can be seen from FIG. 15 and the enlarged detail X therefrom shown in FIG. 16, a concave portion of the contact surface 4 merges into a convex central portion 5 before it then again continues into a concave portion.

Figure 17:
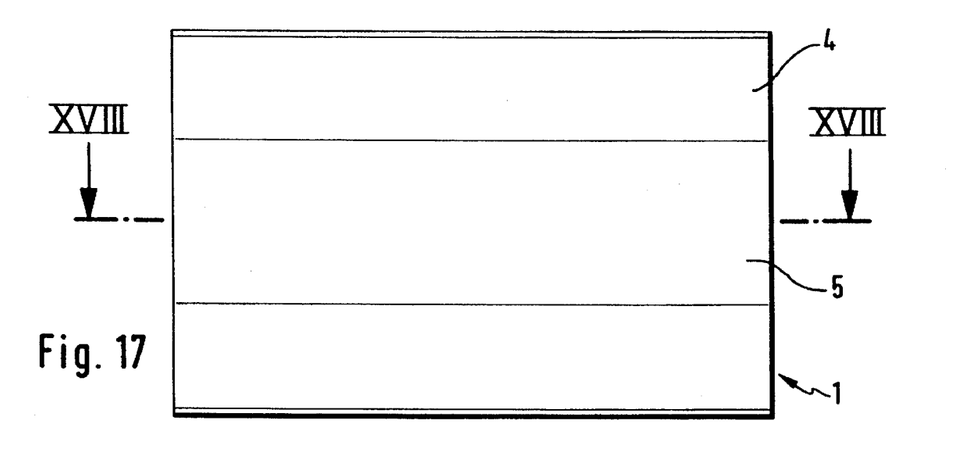
FIG. 17 is a side view of a spacer of the invention whose central region has a convex contour both in the transverse and in the longitudinal direction.
Figure 18:
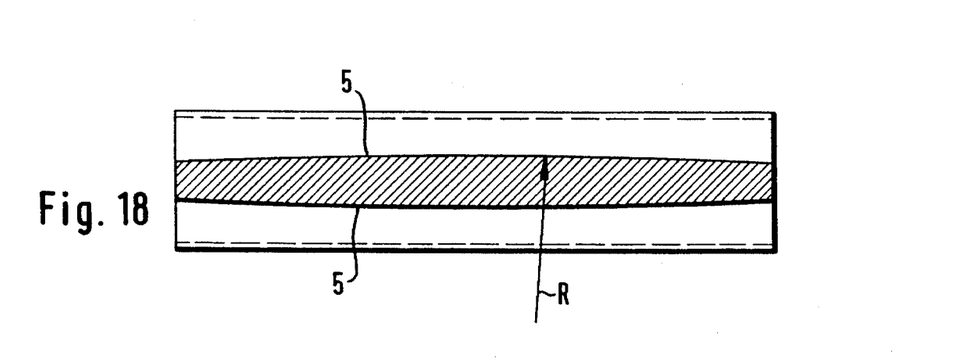
FIG. 18 is a longitudinal cross-section through a spacer taken along line XVIII—XVIII of FIG. 17.

Such a shape of the contact surface 4 is likewise obtained in the transverse direction of the spacer 1 as can be seen in the side view shown in FIG. 17 and in the cross-section taken along line XVIII—XVIII.

Thus, a pointwise contact is obtained between the spacer 1 and the adjoining rolling elements 2 at the center of the contact surface 4 of the spacer 1 because the highest point of the convex central portion 5 of the contact surface 4 both in the longitudinal and in the transverse direction is situated at this center.

Such a pointwise contact further reduces friction as compared to a linear contact.

Figure 19:
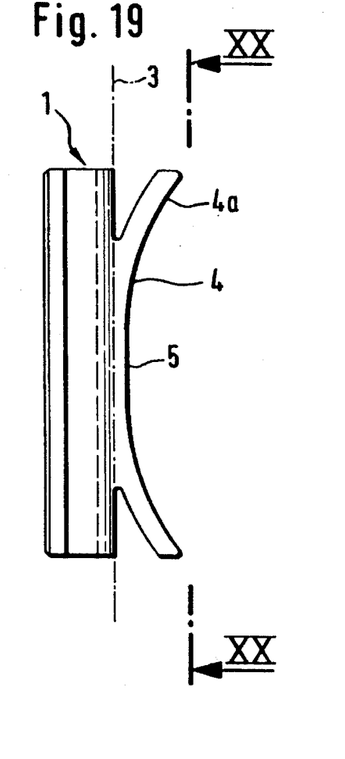
FIG. 19 is a front view of a spacer of the invention in which the contact surfaces on the two sides of the separating plane are offset at an angle of 90° to each other.
Figure 20:
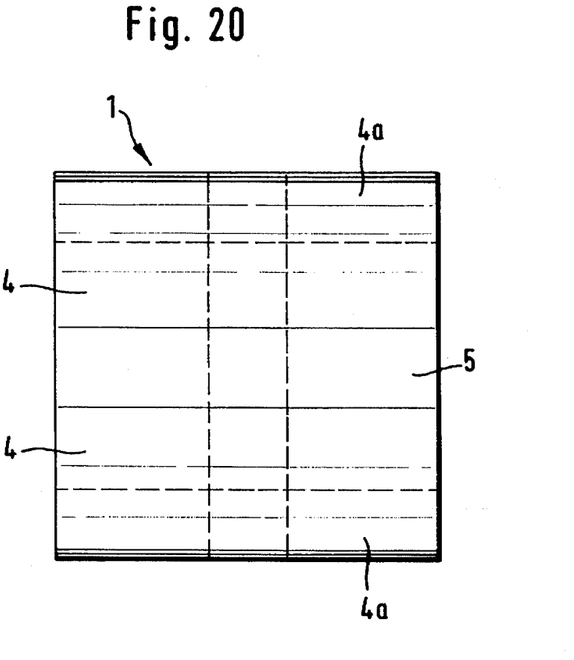
FIG. 20 is a side view of a spacer taken along ling XX—XX of FIG. 19.

A distinguishing feature of the spacer 1 shown in FIGS. 19 and 20 is that the contact surfaces 4 comprising the end sections 4a and the central portion 5 are arranged offset at an angle of 90° to each other on either side of the separating plane 3.

Rolling elements 2 whose axes of rotation are likewise offset at 90° can thus roll on both sides on such offset contact surfaces 4 so that such a spacer 1 can also be used in cross roller bearings.

List of Reference Numbers

| | |
|---|---|
| 1 | Spacer |
| 2 | Rolling element |
| 3 | Central longitudinal plane |
| 4 | Contact surface |
| 4a | End section |
| 5 | Flat, convex or concave part of contact surface |
| 6 | Recess |
| 7, 8 | Radius of curvature |
| 9 | Bevel |
| 10 | Outer ring |
| 10a | Rim |
| 11 | Inner ring |
| 11a | Rim |
| 12 | Pitch circle |
| 13 | Recess |
| 14 | Ball |
| 15 | Cylindrical roller |
| 16 | Recess |
| 17 | Sliding shoe |

We claim:

1. A radial rolling bearing having cylindrical rolling elements (2) which roll between an inner and an outer ring (11, 10) while individual spacers (1) are disposed between every two adjacent rolling elements (2), the spacers (1) comprising, an both sides of their central longitudinal plane (3), contact surfaces (4) while being guided during rotation of the radial railing bearing by one of their end sections (4a) on a raceway of the inner or the outer ring (11, 10), characterized in that one portion (5) of the contact surfaces (4) on each side of a pitch circle (12) of the radial rolling bearing has a convex, a concave or a flat contour, and that the contact surfaces of at least one end section of each spacer are concave having a radius of curvature (7) which is larger than the radius of curvature (8) of the rolling elements (2), and in case of a concave configuration of said portion (5), a radius of curvature thereof is larger than the radius of curvature (7) of the contact surfaces of the end sections (4a).

2. A radial rolling bearing of claim 1 wherein the spacers (1) comprise on at least one end section (4a), a sliding shoe (17) having a curved surface facing the raceway, characterized in that the sliding shoe (17) is configured as a ring segment.

3. A radial rolling bearing of claim 1 wherein the portion (5) has a convex contour both in longitudinal and in transverse direction.

4. A radial rolling bearing of claim 1 wherein central regions of the end sections (4a) of the contact surfaces (4) adjacent to the inner and/or outer ring (11, 10) comprise recesses (13).

5. A radial rolling bearing of claim 1 wherein an axial dimension of the spacers (1) is smaller than an axial dimension of the raceways of the inner and of the outer ring (11, 10) or than an axial dimension of the rolling elements (2).

6. A radial rolling bearing of claim 1 wherein edge regions of the end sections (4a) of the contact surfaces (4) adjoining the inner and the outer ring (11, 10) comprise recesses (13).

7. A radial rolling bearing of claim 1 wherein rolling elements (14 or 15) are snapped into the portions (5).

8. A radial rolling bearing of claim 1 wherein the portion (5) comprises a recess (16) at its center.

9. A radial rolling bearing of claim 1 wherein the spacers (1) are made of a plastic or a ceramic material or of an aluminium or copper alloy.

10. A radial rolling bearing of claim 1 wherein the spacers (1) are made of sheet metal and their surfaces facing the rolling elements (2) and the raceways of the inner and the outer ring (11, 10) are covered with a plastic layer.

11. A radial rolling bearing of claims 1 and 2 wherein the end sections (4a) of the contact surfaces (4) adjoining the inner and/or outer ring (11, 10) have an elastic configuration.

12. A radial rolling bearing of claim 1 wherein the contact surfaces (4) are arranged angularly offset to each other on either side of the central longitudinal plane (3).

13. A radial rolling bearing of claim 1 wherein the end sections (4a) of the contact surfaces (4) bearing against the raceways comprise a bevel (9).

* * * * *